(12) United States Patent
Zalevsky

(10) Patent No.: US 7,777,929 B2
(45) Date of Patent: Aug. 17, 2010

(54) ELECTRIC DEVICE AND METHOD OF ITS FABRICATION

(75) Inventor: Zeez Zalevsky, Rosh Ha'ayin (IL)

(73) Assignee: Bar Iian University, Ramat Gan (IL)

( * ) Notice: Subject to any disclaimer, the term of this patent is extended or adjusted under 35 U.S.C. 154(b) by 166 days.

(21) Appl. No.: 11/814,717

(22) Filed: Jul. 25, 2007

(65) Prior Publication Data

US 2008/0298741 A1 Dec. 4, 2008

Related U.S. Application Data

(60) Provisional application No. 60/646,516, filed on Jan. 25, 2005.

(51) Int. Cl.
*G02B 1/03* (2006.01)
*G02B 26/00* (2006.01)

(52) U.S. Cl. .................................. 359/245; 359/237

(58) Field of Classification Search ............ 359/237, 359/245–255, 291; 385/2, 8
See application file for complete search history.

(56) References Cited

U.S. PATENT DOCUMENTS

| | | | |
|---|---|---|---|
| 4,986,639 A | 1/1991 | Chang et al. | |
| 5,081,542 A | 1/1992 | Efron et al. | |
| 5,255,117 A | 10/1993 | Cushman | |
| 5,343,313 A | 8/1994 | Fergason | |
| 5,451,765 A | 9/1995 | Gerber | |
| 5,760,852 A | 6/1998 | Wu et al. | |
| 5,802,236 A | 9/1998 | DiGiovanni et al. | |
| 5,828,437 A | 10/1998 | Hubert-Habart et al. | |
| 6,128,123 A * | 10/2000 | Wagner | 359/260 |
| 6,377,403 B1 | 4/2002 | Smith | |
| 7,016,094 B2 * | 3/2006 | Awaya et al. | 359/245 |
| 7,321,702 B2 * | 1/2008 | Akiyama et al. | 385/3 |
| 2005/0225828 A1* | 10/2005 | Zakhleniuk et al. | 359/247 |

OTHER PUBLICATIONS

Philip Russell, "Photonic Crystal Fibers", Science, Vol. 299, pp. 358-368, Jan. 17, 2003.
Jonathan C. Knight, "Photonic crystal fibers", Nature, vol. 424, pp. 847,851, Aug. 14, 2003.
W. H. Grodkiewicz, "Fused Silica Fibers With Metal Cores", Mat. Res. Bull., vol. 10, pp. 1085-1090, 1975.
S. C. Kitson et al., "Photonic band gaps in metallic microcavities", Journal of Applied Physics, vol. 84, No. 5, Sep. 1, 1998.
Z. Zalevsky et al., "Photonic crystal in-fiber devices", Optical Engineering, vol. 44, No. 12, pp. 1-1 to 1-10, Dec. 1, 2005.

* cited by examiner

*Primary Examiner*—Mohammed Hasan
(74) *Attorney, Agent, or Firm*—Browdy and Neimark, PLLC

(57) ABSTRACT

An electronic device and method are presented for creating at least one predetermined stimulus at the device output. The device comprises an electrically non-conductive holey structure carrying at least two active electrically conductive cores electrically insulated from one another along their lengths, for supplying a potential difference between them, and at least one stimulus creator configured to be affected by said potential difference to provide a predetermined output of the device.

26 Claims, 15 Drawing Sheets

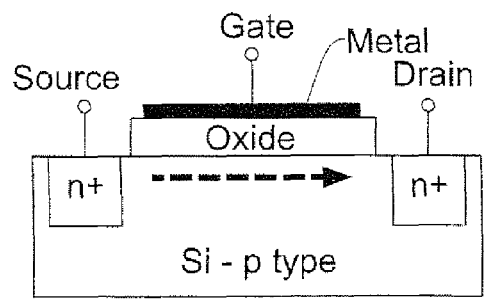
FIG. 6A
(PRIOR ART)
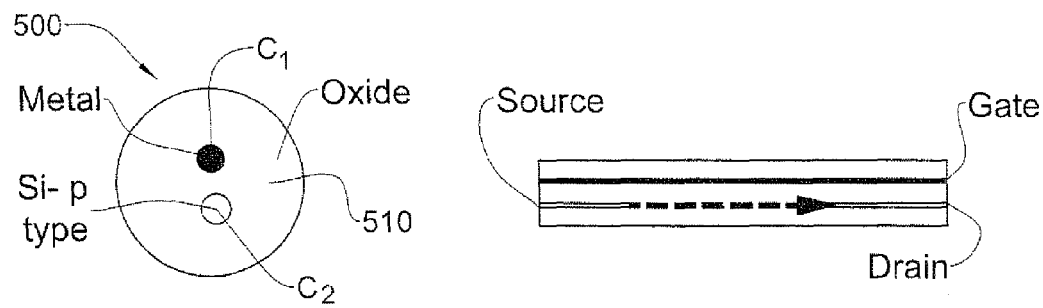
FIG. 6B
FIG. 6C
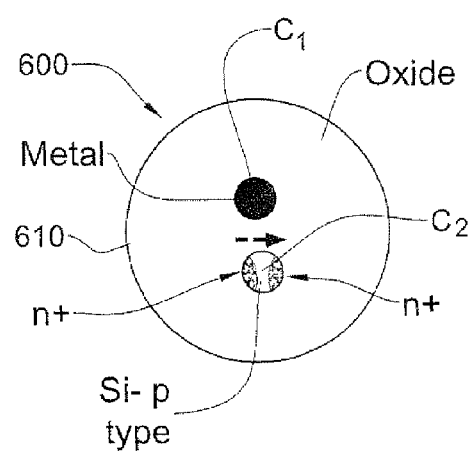
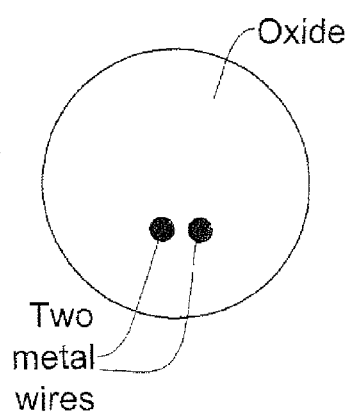
FIG. 6D
FIG. 6E

ELECTRIC DEVICE AND METHOD OF ITS FABRICATION

FIELD OF THE INVENTION

This invention relates to electronic devices of the kind utilizing holey structures.

BACKGROUND OF THE INVENTION

A holey structure is a holey fiber (or fibre), also often called microstructure or photonic crystal fiber. Holey fiber is featured by an array of holes (hollow regions, capillaries) running along the fiber length. Some capillaries of this array may be filled with materials different from the material of the cladding thus forming one or more cores.

It is common to use holey fibers for guiding light. To this end, holey fibers need to have appropriate parameters of cladding and hollow regions (capillaries). The controlled parameters may include fiber and hollow regions sizes and hollow regions spacings. For example, holey fibers may be constructed to allow the light field to dominantly propagate in an air hole (for so-called air-guiding photonic bandgap fibers). Hence low-loss transmission of light through holey fiber can be achieved.

Various light guiding applications as well as probing applications utilizing light or other fields, require small-size devices to be applied to specific, very small locations on a sample (e.g. human body).

SUMMARY OF THE INVENTION

There is a need in the art for miniature effective and cheap electronic devices for various applications.

The present invention provides a novel electronic device and method of its fabrication. The device of the present invention may be configured and operable as a microprobe (e.g., thermo-probe that may and may not be light controllable), communication cable, light modulator, transistor, goggles, etc.

The main idea of the present invention consists of using the hollow regions (capillaries) of a holey structure to form cores made of appropriate electrically conductive material(s) and appropriately accommodated with respect to each other within the holey structure to enable creation of at least one predetermined stimulus at the output of the structure. Also, in some embodiments of the invention, it provides for arranging the hollow regions filled with metal(s) to implement a communication cable screened from the environment, and thus enabling a reduced cross-talk with other such cables. Such a screening may optionally be used in various other embodiments of the invention.

According to one aspect of the invention, there is provided an electronic device for creating at least one predetermined stimulus at the device output, the device comprising: an electrically non-conductive holey structure carrying at least two active electrically conductive cores electrically insulated from one another along their lengths, for supplying a potential difference between them, and at least one stimulus creator configured to be affected by said potential difference to provide a predetermined output of the device.

The device output may include at least one of the following: electrical signal, light signal, and temperature field.

The active, electrically conductive cores comprise at least one of the following combinations: two metal cores, two semiconductor cores, and one metal and one semiconductor core.

According to some embodiment of the invention, the stimulus creator includes at least one semiconductor core extending between and substantially parallel to the two electrically conductive cores. The semiconductor core may be made of an electro absorbing material or material enabling an electro-optical effect. This allows for the device to be operable as a light modulator, i.e. attenuator in case of electro absorbing material, or amplitude and/or phase modulator. The electro absorbing semiconductor material preferably includes one of the following: GaAs-based material, InP-based material, and a combination of such materials.

The light modulator may be configured to prevent output of light intensities higher than a certain threshold value. This is implemented by providing a tunable frequency filter unit, and a beam splitter unit accommodated at the output of the filter unit for separating a portion of light output of the filter unit towards a control unit and allowing passage of remaining light to an input of said holey structure. The device thus provides for controllably operating the holey structure to adjust the intensity of light output from said holey structure. The control unit is configured and operable to enable analyzing of the light intensities of different frequencies incident on the tunable filter, and to operate the holey structure to prevent the undesirably high light intensities to be in the output of the holey structure. The control unit may be configured and operable to operate the tunable filter to scan the frequency range of light that can propagate through said holey structure from the environment. Such a light modulator may be used in a goggle, where each goggle lens carries the light modulator, thereby enabling to adjust the intensity of light passing towards user's eyes.

In some embodiments of the invention, the at least one stimulus creator is constituted by a channel for passing one or more substances therethrough. This enables the device operation as a microprobe enabling to controllably affect a region of interest by material deliver thereto or removal therefrom in response to the potential difference between said two cores.

In some other embodiments of the invention, the device is configured as a temperature source or sensor. The device includes two said active electrically conductive cores which are made of different electrically conductive materials and are connected in series by an electrical connector connecting distal ends of the cores. A temperature change at the distal end of the device can be created in response to potential difference applied between proximal ends of said cores, or a temperature change can be read out as a detectable change in the potential difference.

The above described source/sensor device may be light controllable. To this end, the same holey structure is formed with first and second light channels (that may or may not be filled with any material, e.g. semiconductor materials). One light channel is configured as a single-mode illumination channel and the other light channel is configured as a multi-mode collection channel. Preferably, these light channels extend in a spaced-apart relation between the two electrically conductive cores, thus enabling imaging of the region of interest being heated/cooled or monitored.

The above described source/sensor may include at least one additional channel for passing one or more substances therethrough, e.g. towards the heated/cooled or sensed region. The device is thus configured as a multi-functional microprobe enabling to controllably affect a region of interest by material deliver thereto or removal therefrom (e.g., in response to the measured temperature conditions).

In some other embodiments of the invention, the above-described temperature source/sensor includes two additional electrically conductive cores for applying the potential difference between them and a channel ("empty" channel or electrically conductive core as the case may be) located in the electric field created by said potential difference. Such a device is a multi-functional microprobe enabling various functions, e.g., material deliver/removal at the region of interest under the application of electric field and in response to temperature measurements.

In yet other embodiments of the invention, the device is configured as a transistor. To this end, the first core is a p- or n-type semiconductor having two spaced-apart regions of the same type conductivity opposite to that of the first core material, and the second core is metal or semiconductor. The second core serves as a gate; the two regions in the first core serve as source and drain and a region of the first core between said two regions serves as a transistor channel.

The operation of any one of the above devices can be improved by providing a shielding surrounding in the form of an array of electrically conductive cores.

According to another aspect of the invention, there is provided a light modulator device comprising: an electrically non-conductive holey structure carrying two active electrically conductive cores electrically insulated from one another along their lengths for supplying a potential difference between them, and at least one semiconductor core located extending along the holey structure so as to be in an electric field region created by the potential difference between said two active cores, said semiconductor core being made of electro absorbing material, the device thereby enabling to modulate the light output of the semiconductor core by controlling said potential difference.

According to yet another aspect of the invention, there is provided an electronic device configured for creating or measuring a temperature field in a region of interest, the device comprising: an electrically non-conductive holey structure carrying at least two active electrically conductive cores electrically insulated from one another along their lengths, said cores being made of different materials and being connected in series by an electrical connector between their distal ends at the device facet by which it is brought to the region of interest, thereby enabling to cause a temperature change in the vicinity of said connector in response to a controllable change in a potential difference between the cores and enabling to detect a change in the potential difference in response to a temperature change in the vicinity of said connector.

According to yet another aspect of the invention, there is provided an electronic device comprising at least one transistor structure made in an electrically non-conductive holey structure, said transistor structure being formed by first and second electrically conductive cores, the first core defining a gate electrode insulated from the second core by the holey structure material, and the second core being made from a semiconductor material of p- or n-type conductivity having two spaced-apart regions each of the opposite conductivity type thereby presenting source and drain electrodes, respectively, and defining a channel between the source and drain in the semiconductor material of said second core.

According to yet another aspect of the invention, there is provided a cable structure for use in data communication, the cable structure comprising an electrically non-conductive holey structure configured to define at least one cable unit, the cable unit comprising an electrically conductive core for passing therethrough a data carrying electric signal, and an array of electrically conductive cores arranged so as to surround said data carrying core, thereby forming an electromagnetic shield for said data carrying core and enabling to reduce cross-talk between the cable units.

According to yet another aspect of the invention, there is provided a method for manufacturing the above-described electronic device, the method comprising: providing a structure formed by a preform of a cladding material with one or more rods of electrically conductive material inserted therein; applying local heating to said structure with concurrent pulling of the structure, thereby decreasing cross-sectional dimensions of said structure.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 4A to 4J show the simulation and experimental results of the heater/cooler aspect of the invention;

FIG. 6A shows the conventional configuration of a MOS transistor;

FIGS. 6B-6E exemplify transistor devices of the present invention;

DETAILED DESCRIPTION OF EXEMPLARY EMBODIMENTS

Figure 1A:
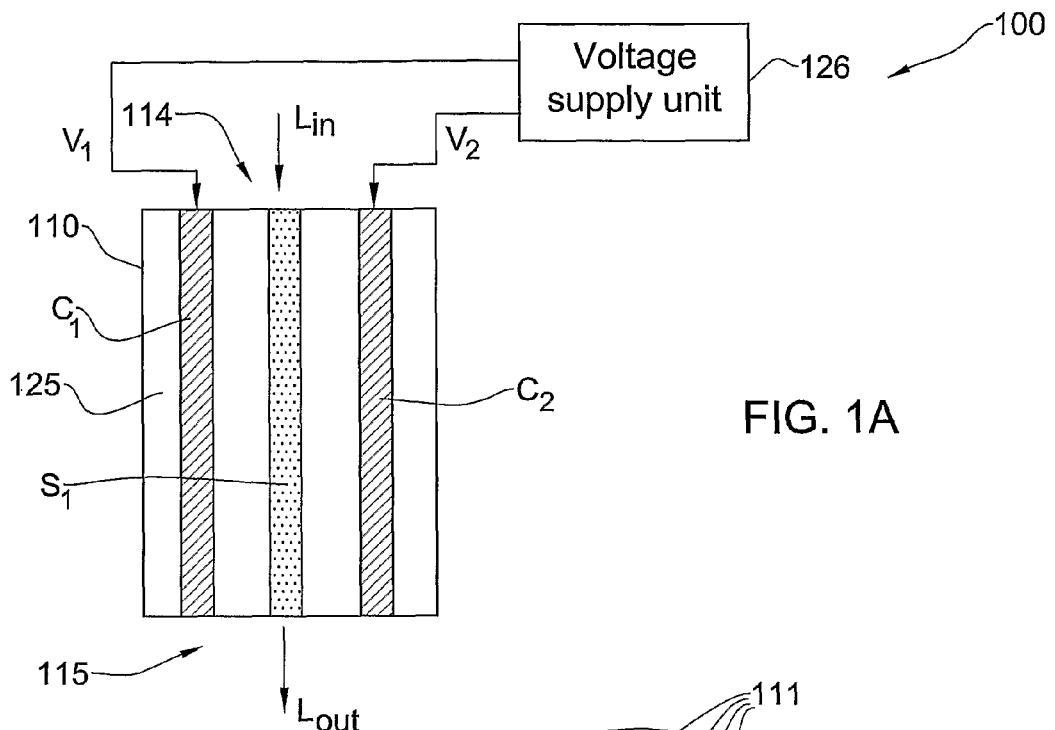
FIGS. 1A and 1B schematically illustrate an example of an electronic device of the present invention, configured as a light modulator.
Figure 1B:
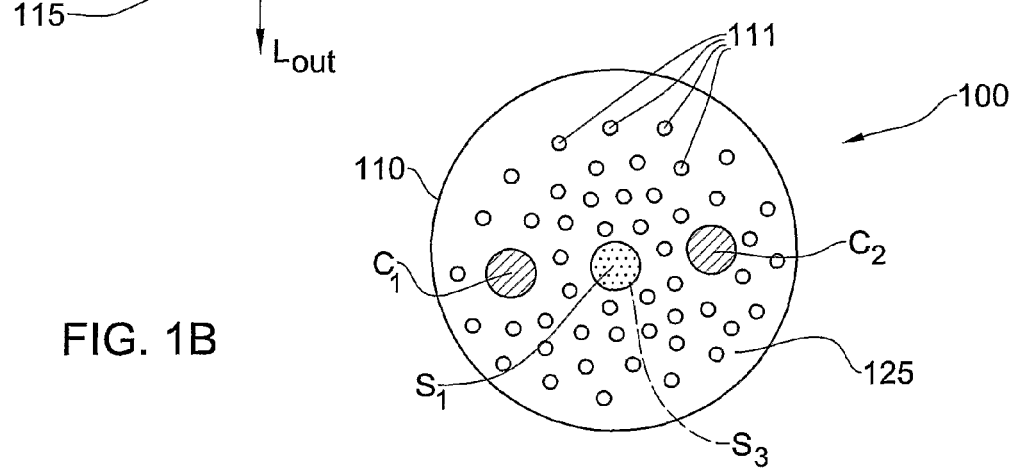

Referring to FIGS. 1A and 1B, there is illustrated an electronic device 100 of the present invention, which in this specific example is configured as a light modulator. FIG. 1A shows a side view of device 100, and FIG. 1B shows a top view thereof. Device 100 utilizes a holey fiber structure 110 for creating at least one predetermined stimulus at a device output (distal end) 115. To this end, device 100 includes holey fiber structure 110 configured to define a holey fiber of an electrically non-conductive cladding 125 carrying at least two active electrically conductive elements (cores) $C_1$ and $C_2$ arranged to be electrically insulated from one another along their lengths by the cladding 125 material, and to define a stimulus creator $S_1$. Preferably, the holey structure is a piece of photonic crystal, which is typically formed with a plurality of hollow regions, generally at 111, in its cladding 125 (as shown in FIG. 1B). In some applications, device 100 may be configured as a coil-like structure.

It should be noted that other hollow regions (not those filled by the cores' and/or stimulator's materials) may be used for other purposes, for example for flowing therethrough various materials. The cross-sectional dimensions of the hollow regions and spacings between them are selected accordingly to the specific application of the device.

Cores $C_1$ and $C_2$ are active electrodes and are supplied with a control potential difference (i.e. voltage) between them during the operation of device 100. Accordingly, device 100 is connectable to a voltage supply unit 126. These cores $C_1$ and $C_2$ may be made of the same or different metal or semiconductor or other electrically conductive material(s). The potential difference $\Delta V = V_1 - V_2$ between cores $C_1$ and $C_2$ affects some stimulus creator, as will be described below.

In the example of FIGS. 1A-1B, device 100 is configured as a modulator based on the effect of electro-absorption (thus allowing attenuation, i.e. reduction of the light intensity at the device output) or on the electro-optical effect (thus allowing any amplitude and/or phase modulation of light). This is implemented by providing stimulus creator $S_1$ in the form of a semiconductor core capable of transmitting a multi-mode or a single-mode light from a proximal end 114 to distal end 115 of holey structure 110. Stimulus creator $S_1$ extends along a hollow region of structure 110 so as to be within an electric field region created by the potential difference $\Delta V$ between cores $C_1$ and $C_2$, e.g. is located between the cores.

For example, the semiconductor material of stimulus creator $S_1$ is selected to have a substantial electro-absorption property in a frequency range of the input light that is to be modulated by the device. Hence device 100 is enabled to modulate input light $L_{in}$ by partially or fully blocking it in response to the control voltage (potential difference $\Delta V$) applied to electrodes $C_1$ and $C_2$. Output light $L_{out}$ of device 100 is thus controlled by the voltage on cores $C_1$ and $C_2$.

Figure 1C:
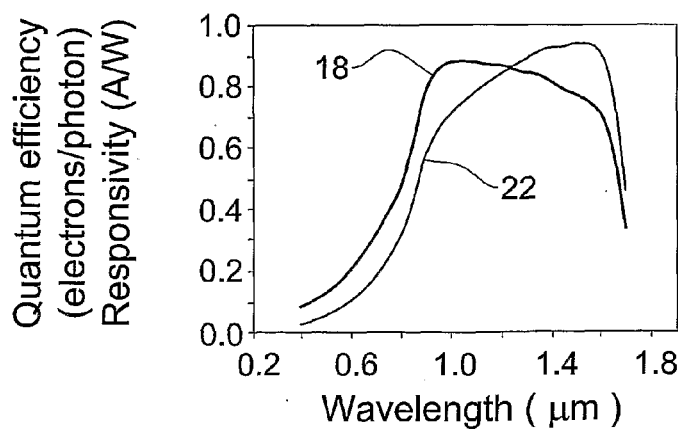
FIG. 1C shows a spectral response of GaAs bulk structure, suitable to be used as a core material in the device of the invention.

Preferably, stimulus creator $S_1$ (optical core in this example) is made of a direct band semiconductor, such as InGaAsP or a different alloy of GaAs and/or InP or of any other known suitable electroabsorbing material. FIG. 1C shows a spectral response of quantum efficiency (graph 18) and responsivity (graph 22) of bulk GaAs. Such material can be used for forming stimulus creator $S_1$ (optical core) capable of transmitting and allowing modulation of multi-mode light of a wide spectral range including the visible range (such light may be used for transmitting images).

Preferably, stimulus creator $S_1$ is made of a direct band bulk semiconductor allowing high transmission of light through the fiber, when no voltage is applied. This condition is better realized when an energy gap of the optical core's semiconductor is selected so as to be slightly larger than the upper frequency of the frequency range of light to be transmitted, to prevent generation of photocarriers in the structure. Generally, in a fiber having the effective optical gap different from the energy gap of the core material (such as in case of a fiber optical core with dimensions providing for a substantial quantum confinement. or in case of optical core's indirect band structure. or in case of significant excitonic absorption), the above described high transmission condition signifies that the "effective optical gap" of the core is higher than the highest frequency to be transmitted.

Preferably the optical core's energy gap is selected so that the middle of the forbidden band is lower than the lowest frequency of the frequency range of light to be transmitted. This enables efficient use of electroabsorption effect, which is stronger near the bottom of the conductance band.

In the present example of the invention (electro-absorption modulator), the parameters of cladding 125 and hollow regions 111 are selected to satisfy two requirements of the structure. First, structure 110 is substantially transparent for a predetermined frequency range (when the control voltage values allow the light transmission). Second, in structure 110, stimulus creator $S_1$ is responsive to the electric field created by electrodes $C_1$ and $C_2$. To this end, the stimulus creator is preferably accommodated in between these electrodes, and the electrodes are preferably close to each other. Thus, in a preferred configuration, a plurality of hollow regions 111 is arranged in a lattice, enabling propagation of light through the holey structure, and core $C_1$, stimulus creator $S_1$, and core $C_2$ are accommodated in adjacent hollow regions.

However, it should be noted, that spacings between core $C_1$, stimulus creator $S_1$, and core $C_2$ are preferably large enough to prevent the transfer of charge carriers from any of these three cores to another. Since the light modulator of the invention advantageously utilizes electro-absorption (e.g. Franz-Keldysh or Stark) effect, known to have an inherently smaller characteristic time than the charge transfer, thus the effect of not preventing the charge transfer between the cores would act against the control voltage applied between electrodes $C_1$ and $C_2$ (i.e. tend to decrease it). Hence, this condition determines the minimum allowed distance between the cores. Most claddings are substantially electrically non-conductive, thus a thin wall of such cladding is sufficient to provide an electrical isolation between the conductive cores. The minimum allowed distance between the electrodes can be just slightly larger than the cross-sectional size (e.g. diameter) of the optical core. The cross-sectional size of the core can be of about few microns (e.g. 50 microns for a multimode optical core).

Also, hollow regions 111 of structure 110 preferably confine a substantially large portion of the propagating light field within the stimulus creator $S_1$. This increases utilization of the effect of electro-absorption occurring in stimulus creator $S_1$ to a maximum.

It should be noted, that the electro-absorption effect is advantageously used in the holey fiber structure of the invention when compared to a non-holey fiber. This is due to the fact that the electrical isolation provided by the cladding (e.g. oxide) allows positioning electrodes $C_1$ and $C_2$ very close to each other. This means that a certain electrical field is realized at smaller external voltages. The invention advantageously provides for using natural heat isolation provided by the hollow regions and cladding of the structure, and the structure's mechanical properties for various applications. In particular, high breakage resistance and flexibility of the structure allow shaping the device according to the goals of the application while preserving the electrical and heat isolation.

In experiments, the electro-absorption based modulators using InGaAsP demonstrate light shutting at response times of less than 2 ps.

As indicated above, the light modulator of the present invention can be configured for amplitude modulation (not necessarily attenuation) and/or phase modulation. To this end, the semiconductor core $S_1$ material is appropriately selected to possess an electro-optical property, to enable the Pockels effect (occurring in crystals that lack inversion symmetry, such as lithium niobate or gallium arsenide) or the Kerr effect (also known as the quadratic electro-optic (QEO) effect occurring practically in all materials). Some materials such as $LiNbO_3$ or GaAs can affect the polarization of light passing therethrough in response to the applied electric field (this is the electro-optical effect, i.e. the electrical field effects a change in the refractive index in the extraordinary axis). When such materials are used, passing polarized light, emerging from the holey structure, through an appropriate polarizer, amplitude modulation would be achieved. More specifically, a polarizer is located at the output of the device, and the polarization of the input light is adjusted to be at 45 degrees to the principle axes of the semiconductor material of $S_1$ such that indeed polarization rotation is expressed as amplitude modulation. In the phase modulators, the polarization of input light should coincide with the extraordinary principle axis of the crystal (semiconductor core $S_1$).

Turning back to FIGS. 1A-1B, a somewhat similar configuration, i.e. two spaced-apart electrically conductive cores $C_1$ and $C_2$ in a fiber (cladding) and a stimulus creator channel $S_3$ between them (generally in the electric field created thereby) can be used for a different application: for conveying substance(s) to and from a region of interest. In this case, channel $S_3$ needs not be constantly filled with any material but is an "empty" channel which serves to convey substance(s). These substances are of the kind guidable (and/or affectable) by an electric field, for example, polar substances guidable by the electro-capillarity effect. The latter is enhanced in the invented structure due to the small cross-sectional dimensions of the capillaries.

Figure 2A:
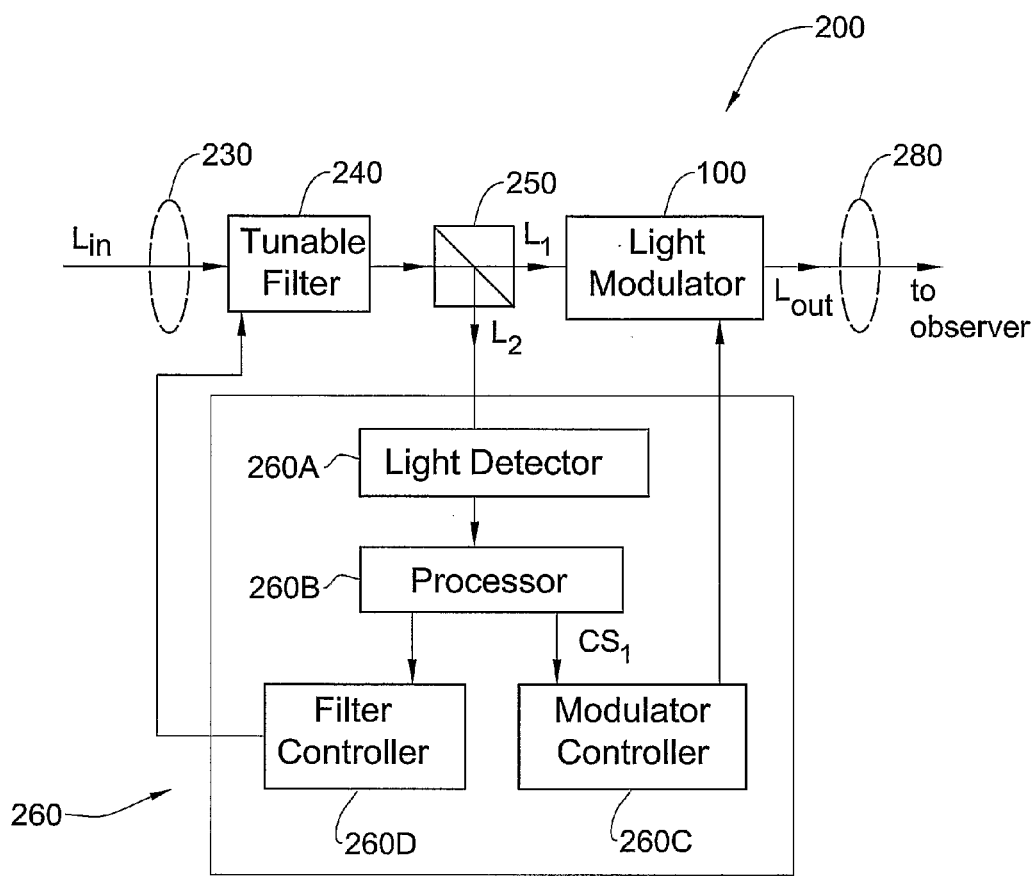
FIG. 2A exemplifies an imaging system of the present invention utilizing the device of FIGS. 1A-1B.

Referring to FIG. 2A, there is shown a schematic diagram of a system 200 of the present invention, utilizing the above-described light modulator 100. System 200 is configured as a safeguard system for an observer (a device or a living organism). System 200 includes a tunable frequency filter 240 which can be of any known suitable configuration, a beam splitter 250, a control unit 260, and a modulator/shutter 100 configured as described above. Preferably, system 200 also includes a lens assembly 230 (including one or more lenses) for collecting light with a certain field of view from a region of interest, and an output lens assembly 280.

Figure 2B:
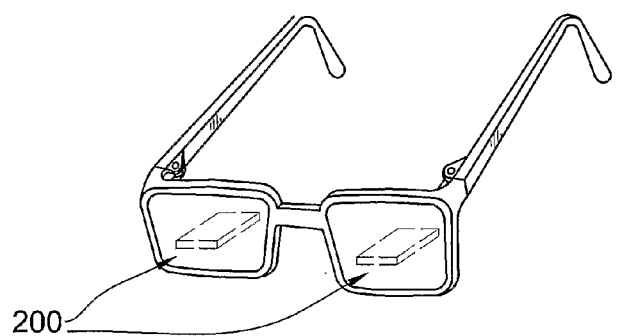
FIG. 2B exemplifies a goggle utilizing the imaging system of FIG. 2A.

FIG. 2B exemplifies a specific application of such system, namely goggle 290, where each goggle's lens carries system 200, thus preventing a wearer from undesired radiation (i.e. typically, high intensity radiation).

As indicated above, light modulator device 100 may be configured as a coil-like structure. In the goggle' example, the invention provides for effective goggle operation using just a 10 cm coil-like holey fiber structure while the light is coupled to and from its multi modal core by lenses. The diameter of the fiber can be few hundred microns.

System 200 can operate to realize a secured imaging scheme, for example considering the case that the intensity of the incoming light abruptly increases above a certain threshold, e.g. due to the fact it includes light originated from a laser source or a light-generating event within the field of view. Initially, tunable filter 240 lets all incoming light $L_{in}$ to pass therethrough towards beam splitter 250. The latter splits light into first and second portions $L_1$ and $L_2$, preferably of similar spectral properties and the second portion $L_2$ being preferably of a smaller intensity than the first portion $L_1$. The first portion $L_1$ passes through beam splitter 250 to modulator/shutter 100, and the second portion $L_2$ is reflected to control unit 260.

Control unit 260 includes inter alia a light detection unit 260A, a data processing and analyzing utility 260B, a modulator controller (voltage supply) 260C, and a filter controller 260D (this controller may also be a voltage supply unit depending on the type of tunable filter used). Control unit 260 is configured and operable to analyze the received light portion $L_2$, and upon detecting the high intensity radiation values (i.e. the intensity being above the predefined threshold) generate a control signal $CS_1$ to modulator controller 260C to apply higher control voltage to the electrodes' cores of light modulator/shutter 100, to thereby cause the stimulus creator to partially or fully block the propagation of the first portion of light $L_1$, e.g. at response times of less than 2 ps. Moreover, control unit 260 analyzes the received light to determine the frequency range of the light intensities higher than said threshold in the received light. To this end, light detection assembly 260A may include a spectrophotometer. Alternatively or additionally, tunable filter 240 may be operated for sweeping the frequency range of the light modulator transmission: the tunable filter scans the spectrum in order to allocate the spectral slot responsible for the high radiation values. When this high radiation spectral slot is allocated, the filter partially or fully blocks it (this process can take a few milliseconds, e.g. 2-3 ms). Filter controller 260D then tunes the filter to allow passage therethrough of only a frequency subrange of relatively low intensity that is allowed to reach the observer. Then, the control unit operates to open the modulator/shutter. If observer's refresh time (e.g. 1/30 s) is longer than the time taken by the tunable filter, then no important information will be lost for the observer.

It should be noted that one of the important parameters of the modulator is the fiber structure length. Generally, for a fiber, the light transmittance coefficient γ is reciprocal to the exponent of the product of the light absorption coefficient α and the fiber length L: $\gamma = \exp(-\alpha L)$. The contrast between the modulator's passing state and the modulator's blocking state equals $R_{on/off}(dB) = 4.343[\alpha(V) - \alpha(0)]L$, where V is the value of the control voltage used for the transmission modulation. By appropriately selecting the length of the fiber, any contrast level can be reached. However, it is desirable to keep the high amount of light passing through the modulator device, while the device is in the transmitting state: it is desired to keep $\exp(-\alpha(0)L)$ large. This limits the fiber length L.

Figure 3A:
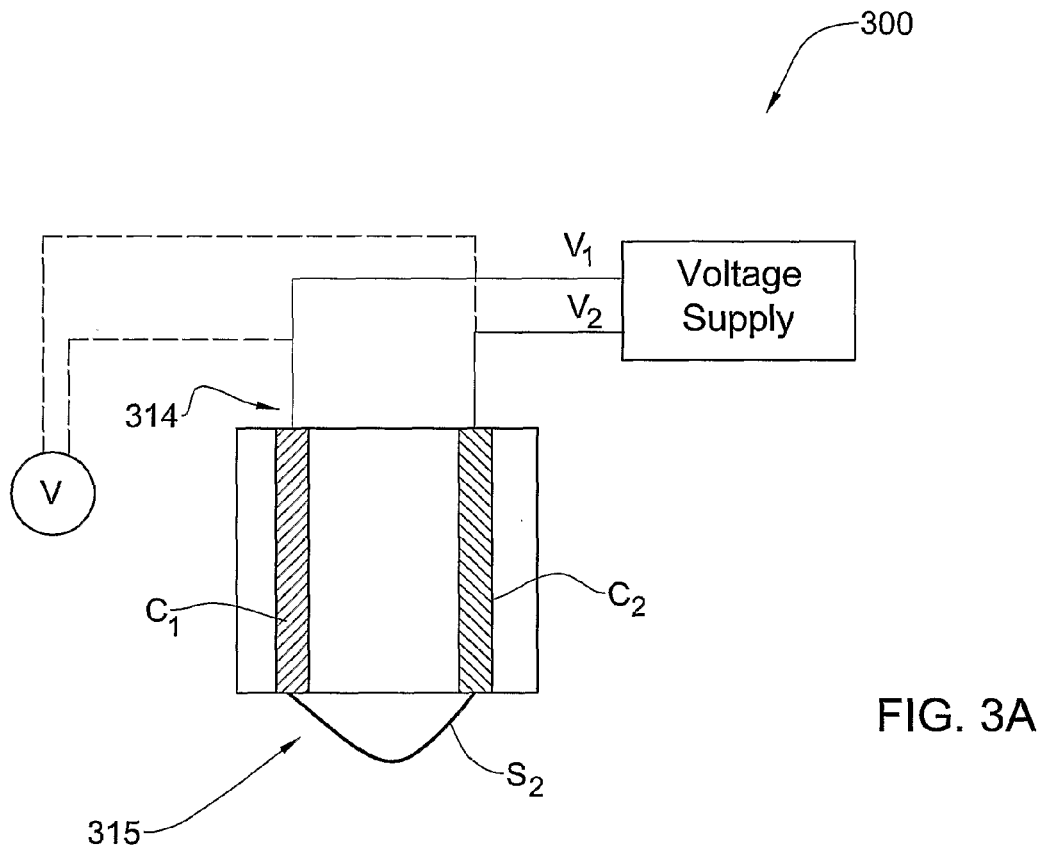
FIGS. 3A and 3B illustrate another example of the device of the present invention configured and operable as a temperature source (heater/cooler) or temperature sensor.
Figure 3B:
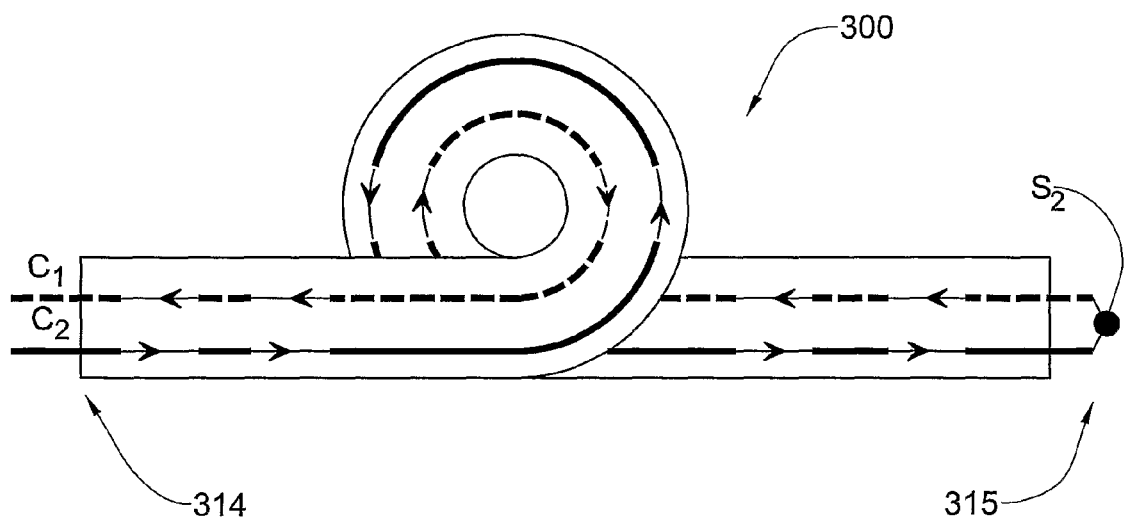

Referring to FIGS. 3A and 3B, there is shown yet another example of a device 300 of the present invention configured and operable as a miniature temperature source (heater/cooler) or temperature sensor. FIG. 3A is a partial cross-sectional view of the device, and FIG. 3B is an example of the coil-like device configuration.

In device 300, electrodes $C_1$ and $C_2$ are connected in series by an electrical connector constituting a stimulus creator $S_2$. Electrodes $C_1$ and $C_2$ are made of different electrically conductive materials (e.g. different metals), thus their series connection constitutes a thermocouple. Considering the device 300 operation as a temperature source, for cooling/heating of samples in proximity of stimulus creator $S_2$, the device operation is based on the Peltier effect: When electrodes $C_1$ and $C_2$ are supplied with the appropriate control voltage at their ends at a proximal end 314 of the device, temperature changes at a distal end 315 of device 300 can be controlled. The direction of the electrical current determines whether stimulus creator $S_2$ produces heat or cold. This heat is called Peltier heat, and it is exchanged between stimulus creator $S_2$ and the surroundings. Considering the device 300 operation as a temperature sensor, it is based on the Seebeck effect: when temperature in the vicinity of connector $S_2$ changes, a change in the potential difference between cores $C_1$ and $C_2$ is induced, which can be detected (as shown in the figure in dashed lines).

It should be noted, that usually doped semiconductors have a larger Peltier effect than other materials. Typically, one of the electrodes in the semiconductor-based thermocouple comprises an n-type material, while the other electrode comprises a p-type material.

Heater/cooler 300 of the present invention, due to its holey structure, is flexible, thin, and its electrodes are well protected from the environment electrically, thermally, and chemically. The chemical protection prevents electrodes from oxidation (i.e. corrosion). Also, electrodes are well isolated from one another by the cladding (e.g. oxide) from which the fiber is created, effectively preventing short circuit even for bent fiber.

It should be noted that device 300 may be used as a temperature sensor: a change in the temperature in the vicinity of distal end 315 induces a corresponding potential difference (control voltage) between electrodes $C_1$ and $C_2$, which can be easily detected. The device can thus be used to detect abscesses, infection, and cancerous regions by the heat that such regions differentially display over the ambient temperature of immediately adjacent tissues.

The heater/cooler of the invention can be used for treating various diseases, e.g. blocking of blood vessels, "cold womb" causing infertility, prostate cancer, with various types of thermotherapy: warming the tissue, killing cancer cells in their early stage of development by burning or freezing a specific diseased cell, thermal marking of cells. Being a microscopic device, the heater/cooler of the invention can be inserted into the tissue in a minimally invasive technique, and can be used for a very localized thermotherapy without affecting and harming anything besides the intended tissue region, thus facilitating a treatment with little or no side effects.

It should be noted that heater/cooler 300, in distinction to a conventional thermocouple, has substantially parallel electrodes located close to one another in the same fiber and therefore can exchange heat. During the device operation several thermoelectric effects take place.

First, proximal and distal ends of electrodes $C_1$ and $C_2$ are environed with media of different temperatures, therefore the Thompson effect takes place for both wires. The Thompson effect is a potential difference created in response to a thermal difference at the wire's ends. Moreover, when a current is passed through the wire with a non-uniform temperature, heat (called Thompson heat) is absorbed or released at any point of the wire.

Other thermoelectric effects that take place during the operation of the heater/cooler of the invention are the Seebeck effect, which signifies an electric potential difference created at a junction of two conductors made of different materials and located at different temperature conditions, and Peltier effect, which signifies heat generation caused by electrical current flowing through this junction In order to better characterize the heater/cooler device of the invention and to estimate the control voltage that will provide a certain desirable temperature at the distal end, all thermoelectric and heat transfer effects between electrodes and environment should be considered together. However, it should be noted, that in device 300, electrodes $C_1$ and $C_2$ are separated only with a region of the cladding material or a region of the holey structure, which are worse heat isolators than air. Heat, exchanged by electrodes $C_1$ and $C_2$, tends to decrease the temperature difference and therefore the potential difference between them. Hence a larger potential difference needs to be applied to the device of the invention than to a thermocouple whose wires are perfectly thermally isolated.

The following are simulation and experiments carried out by the inventor.

Figure 4A:
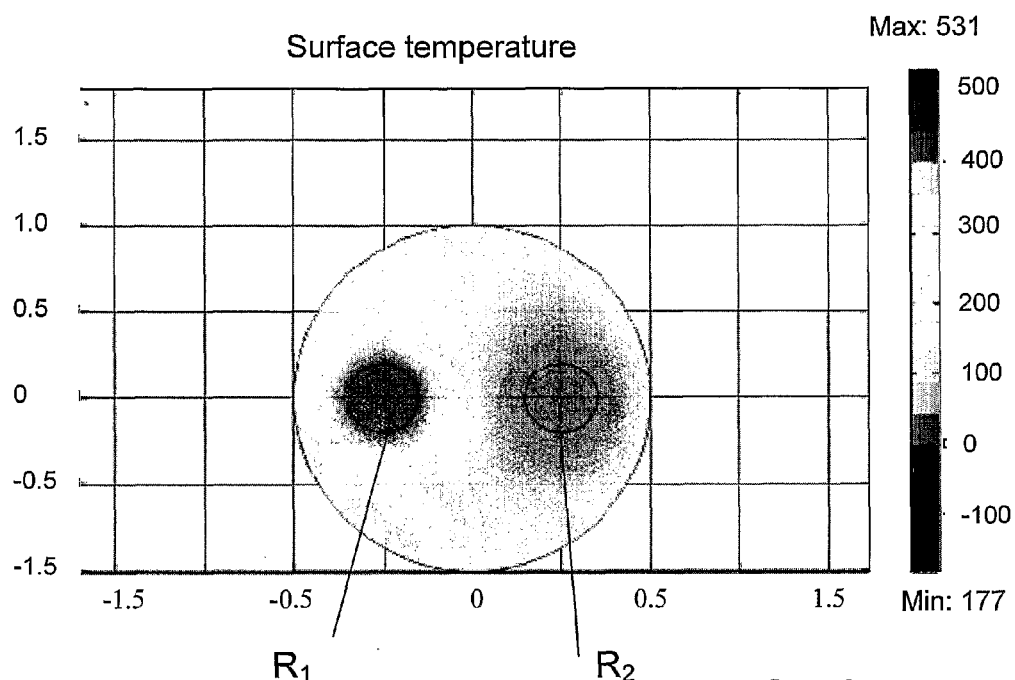
Figure 4B:
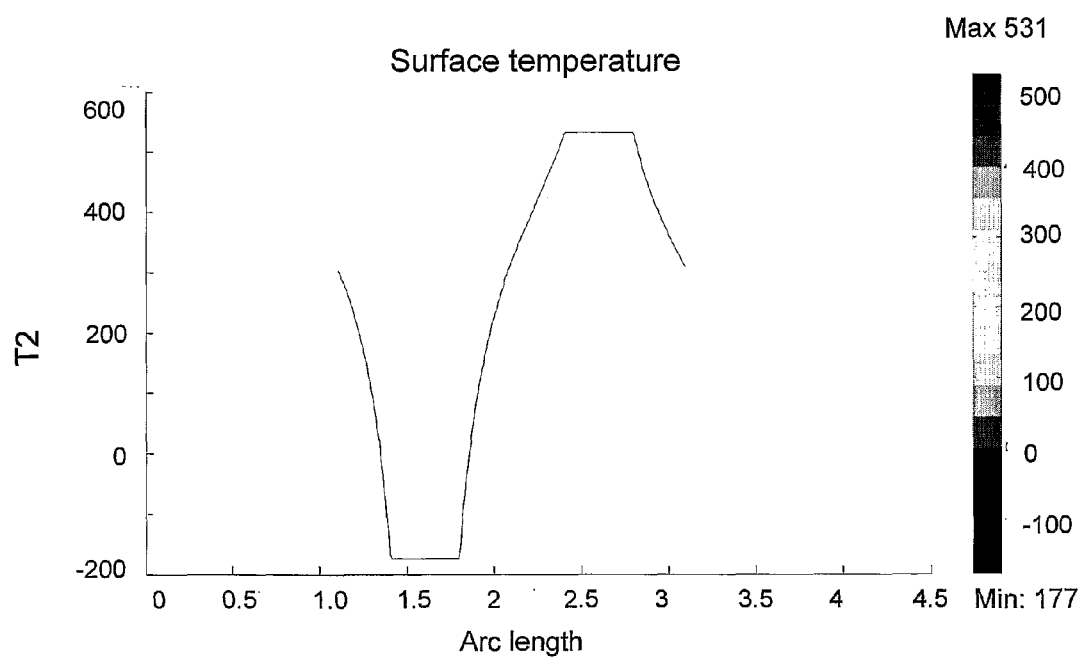

Using the FEMLAB SIMULATOR, the inventor built a model of a silica fiber containing two metals in different temperatures. FIG. 4A shows the heat flow from the heater metal to the cooler in a cross section of the fiber F. The metals are the two circles $R_1$ and $R_2$ where circle $R_1$ represents the cooler metal and circle $R_2$ represent the heater metal. As shown, the heat flows through the silica F between the metals. FIG. 4B shows the cross section plot line of FIG. 4A.

In order to examine this phenomenon, two metals were used, Constantan and Copper, a Peltier junction between them was created, and a thermal difference between the edges was forced. One edge was held at 0° C. and the other one at T° C. The thermal difference was increased (by increasing T). The potential difference ΔV that developed in the junction was measured. This experiment was performed in three different ways. The first experiment was performed when the two metals were separated, the second when there was a glass between them and the third when the metals were tight with only an electrical isolator between them. The graph of ΔV versus ΔT was plotted for each case.

Also, the power amount was estimated that is to be supplied in order to achieve a certain amount of heat. The amount of power was calculated using:

$$P = \frac{\varepsilon_{ml}^2}{R} \quad (1)$$

where $\varepsilon_{ml}$ is the voltage measured between the two wires. The wires resistivity was measured using the equation (2)

$$R = R_{Const} + R_{Cu} \quad (2)$$

where $R_{Cu}$ and $R_{Const}$ are given by:

$$R_{Cu} = (R_0)_{Cu} \cdot (1 + \alpha_{Cu} \Delta T) \quad (3)$$

$$R_{Const} = (R_0)_{Const} \cdot (1 + \alpha_{Const} \Delta T) \quad (4)$$

where $\alpha_{Cu} = 0.0039$, $(R_0)_{Cu} = 4.31$, $\alpha_{const} \approx 0.0002$, $(R_0)_{const} = 190.014$, $R = R_0(1 + \alpha T)$, α being the constant showing that the resistivities are changed as a function of the temperature, and T being the thermal difference.

Figure 4C:
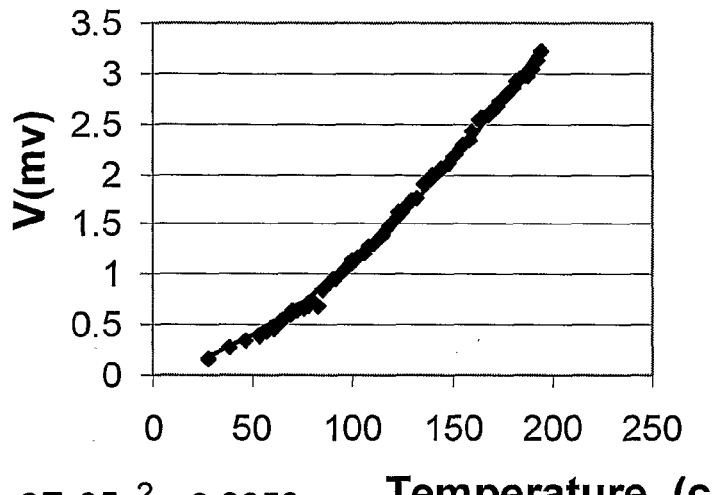
Figure 4D:
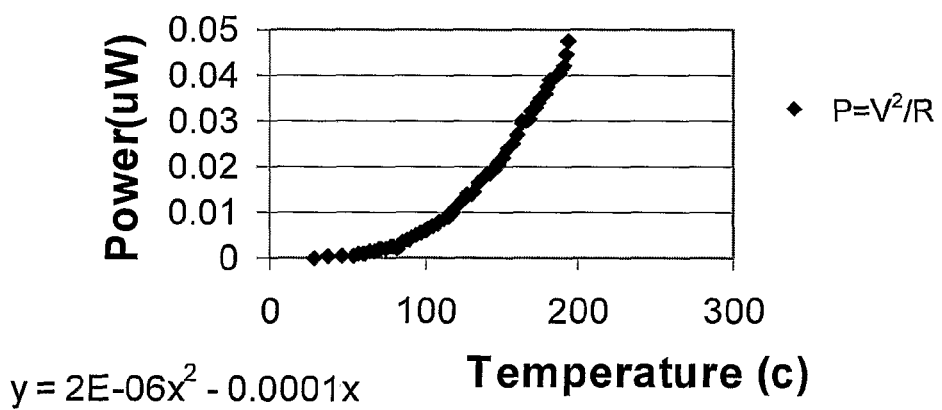
Figure 4E:
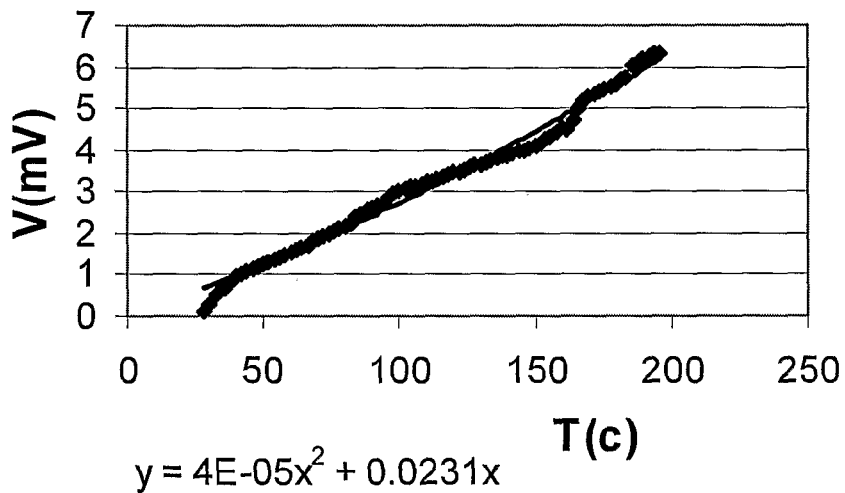
Figure 4F:
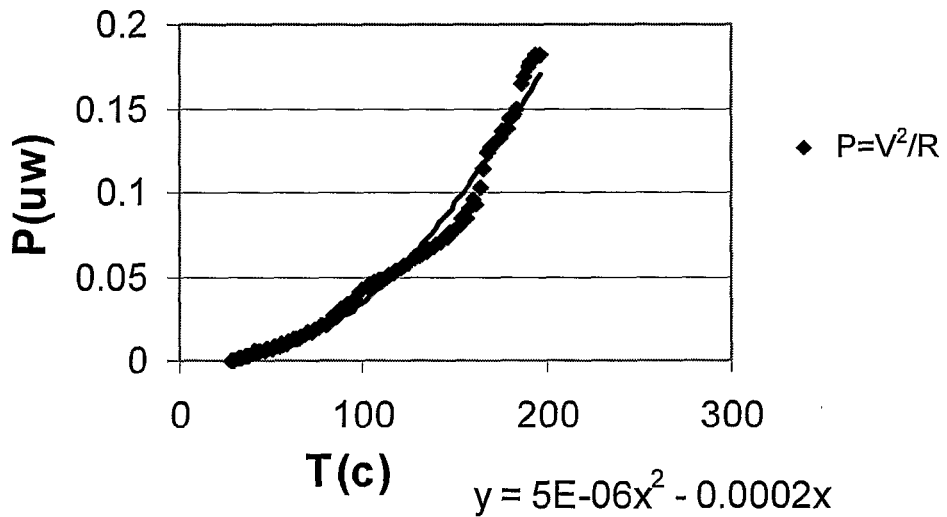
Figure 4G:
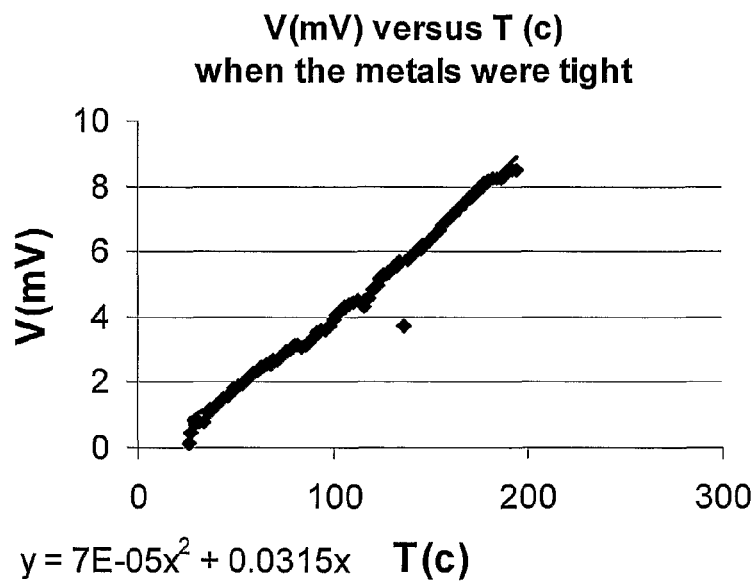
Figure 4H:
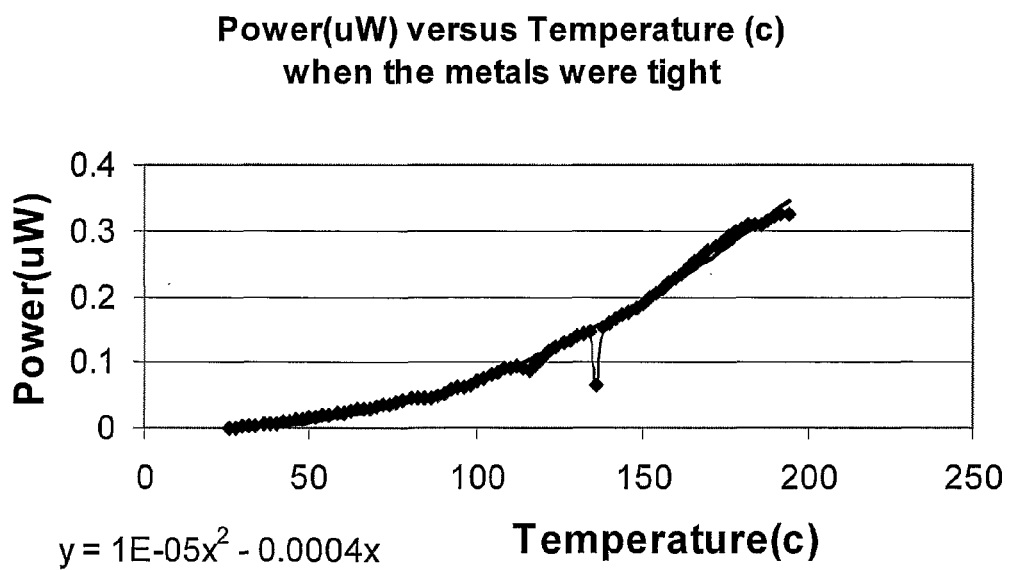
Figure 4J:
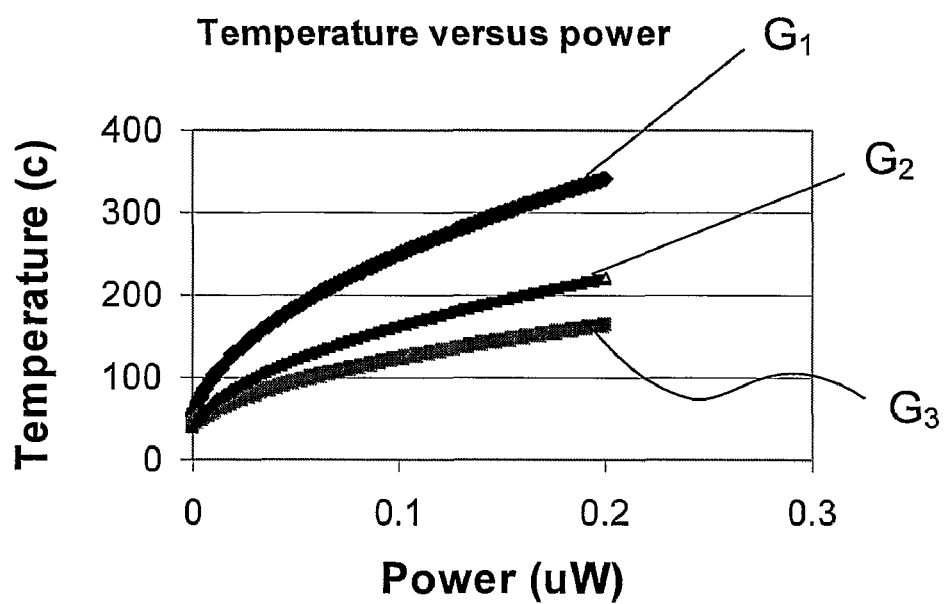

FIGS. 4C-4J show the experimental results of loss of power due to heat flow between the wires for three examples using, respectively, three different distances between the wires. The "potential difference vs. temperature" and "power vs. temperature" graphs are shown in the figures. FIGS. 4C-4D show the results of the first experiment, the two separated metals. FIGS. 4E-4F correspond to the second experiment, when glass is used between the two metals; a thermal difference was created by holding one edge at 0° C. and the other edge on a heater with a determined temperature. FIGS. 4G-4H show the third experiment, when the metals were tight.

In order to compare between the three experiments, the equations of the Power versus Temperature were used to get the temperature T as a function of power, and the temperatures obtained in each of the cases when a certain power was supplied was plotted. The results are shows in FIG. 4J, where graphs $G_1$-$G_3$ correspond to the first, second and third cases, respectively. As shown in the figure, for certain power supply the highest temperature is obtained when the wires are separated (first experiment) and the lowest when they are tight (third experiment). This is because of the loss of heat caused by the heat flow between the wires which is the highest when the wires are tight and insignificant when the wires are separated. When there is a glass divider between the wires (the second experiment), this heat flow is not of its highest value but can not be ignored. Thus, conducted experiments show that in fact the heat exchange between the heater/cooler cores is of significant importance, but will not compromise the device operation.

The heater/cooler device of the present invention can be implemented as a very thin photonic crystal fiber with the option to control the temperature at its edge (whether it's heat or cold). Such a device can be used as a thermal microprobe for various scientific, industrial and medical applications including measurements and affecting biological tissues (e.g. thermally destroying tumors), locally affecting the speed of chemical reactions, scanning thermal microscopy, etc. One particular example of the thermal probe application is fighting cancer. Cancer cells spread quickly in the human body, destroying crucial systems and tissues. Once cancer has covered a large region in the body it often can no longer be removed with help of surgery; and in some locations surgery can not be performed even if the growth has not spread widely. In such cases one of the offered treatments is the chemotherapy. Unfortunately, chemotherapy, being a highly non-selective treatment killing healthy cells as well as cancer cells, harms the patient by destroying the human immune system, causing shedding of hair and other undesirable side effects. Another highly non-selective cancer treatment, radiation, also harms the patient, e.g. it causes impotency if used for the treatment of prostate cancer. The microprobe device of the present invention can be inserted into the human body very easily due to its flexibility, and is able to burn or freeze a specific spot, such as a diseased cell, till it dies without harming anything beside it. Insertion of an optical fiber to the body is harmless due to its small size and simple technique of therapy.

Figure 5A:
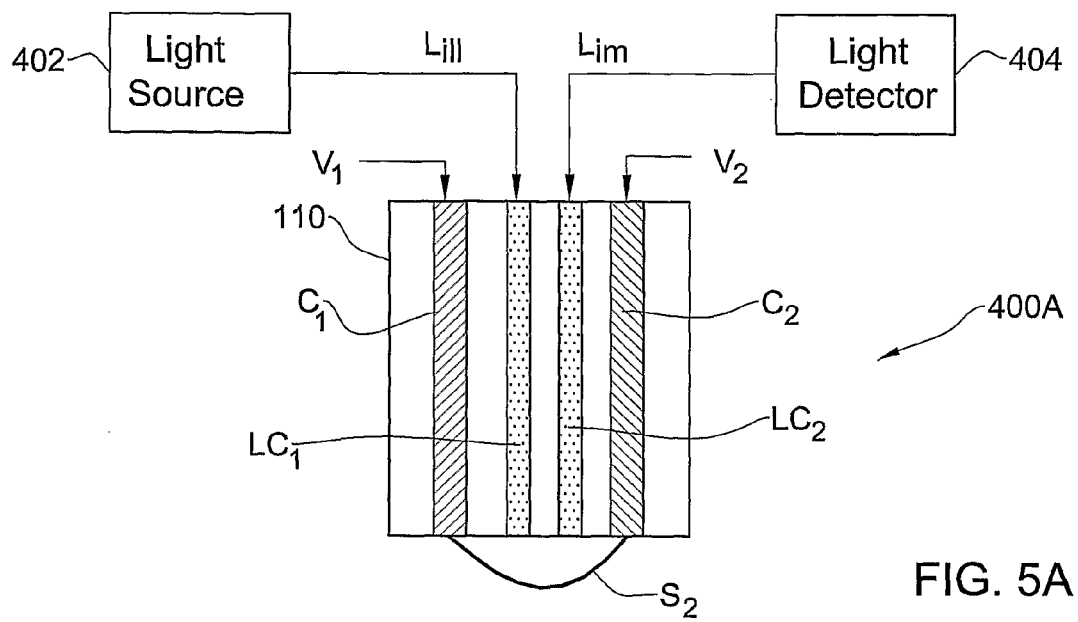
FIGS. 5A and 5B illustrate some other examples of the device of the present invention configured as a multifunctional probe.
Figure 5B:
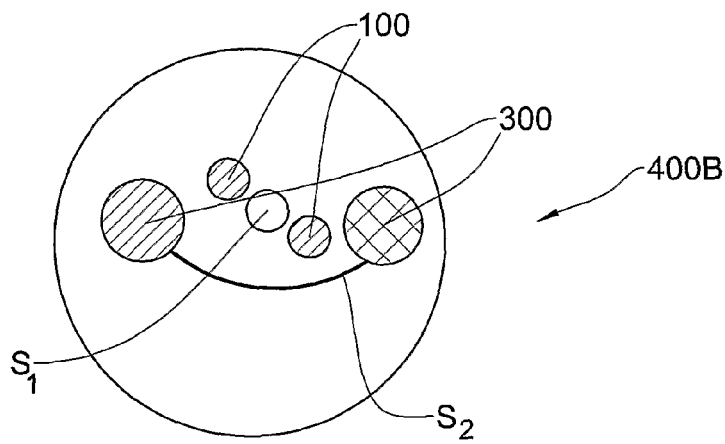

Referring to FIGS. 5A and 5B there are shown some other configurations of the device of the present invention utilizing the above-described temperature source/sensor and additional facilities (the so-called "multi-functional microprobe"). Device 400A of FIG. 5A has the above-described source/sensor structure (300 in FIGS. 3A and/or 3B) formed by two cores $C_1$ and $C_2$ made of different electrically conductive material connected in series by a connector (stimulus creator) $S_2$, and also has at least one additional channel—two channels $LC_1$ and $LC_2$ in the present example.

Device 400A is configured as a light controllable temperature source/sensor being formed with two light channels $LC_1$ and $LC_2$. Preferably, light channel $LC_1$ is a single mode channel and light channel $LC_2$ is a multimode channel. Light channels $LC_1$ and $LC_2$ may be constituted by air or dielectric or semiconductor cores, by the same or different materials. Light channel $LC_1$ is coupled to a light source 402 and serves for guiding illuminating light $L_{ill}$, and channel $LC_2$ is coupled to a light detector 404 and serves for guiding collected light indicative of image $L_{im}$ of the region of interest. In this way one can control the process of inserting heater/cooler (or sensor) 400 into the tissue and imaging the results of the heating/cooling in real-time by illuminating a region of bitterest in the vicinity of the distal end of the heater/cooler with light through channel $LC_1$ and collecting light through channel $LC_2$.

The device of the present invention utilizing the temperature source/sensor structure may be used for other applications, including only one channel $LC_1$ (or $LC_2$) extending so as to be in the vicinity of the electrical connecter $S_2$ (i.e. heated/cooled region). The additional channel(s) may be used for example for supplying certain liquid (e.g. a drug) to the region of interest and for affecting the liquid properties (e.g. viscosity, temperature, etc.) at the region of interest (i.e. at the distal end of the probe) due to the heat created at the region of interest. This may for example be aimed at assisting/controlling in/of the medical treatment, where heating of the treated region or its vicinity causes evaporation of certain liquids and thus enables the vapor outlet through this additional channel; or where the thermo-capillarity property of certain liquid is used to enable its flow to and from the heated/cooled region; or where reacting or mixing certain liquid with different chemical(s) is required (e.g. performing chemo-capillarity).

Alternatively or additionally, one or more additional channels may be used affectable by an electric field as described in the example of FIGS. 1A-1B. This is exemplified in FIG. 5B showing a device 400B configured to include the above-described temperature source/sensor 300 (two electrically conductive cores with an electrical connector $S_2$ between them) and the above-described structure 100 (two electrically conductive cores with a stimulus-creator channel $S_1$ between them). Device 410B thus allows for example for conveying substance(s) from and towards the region of interest (e.g. while under medical treatment including measurement or application of the temperature field) by applying an electric field to channel $S_1$, and possibly also effecting substance's thermo-capillarity by means of stimulus connector $S_2$.

Reference is made to FIGS. 6A to 6E illustrating how the present invention can be used to implement a transistor structure. FIG. 6A shows a conventional MOS transistor structure. The basic operation principle of such transistor is as follows: As there is an electric isolator between the Metal and the Silicon (the Oxide), the energy levels inside the Silicon are bent while the Fermi level is flat since there is no electric current between the Metal and the Silicon. The bending of all the energy levels except of the Fermi level may position it closer or further from the conducting or the valence bands. Thus, by applying an external voltage to the Gate (connected to the Metal) one may generate inside the Silicon either an accumulation region (more holes are collected since the Fermi level is closer to the valence band), a depletion region or inversion (the Fermi level is closer to the conducting band and thus near the Oxide there is a majority of electrons in the p-type Silicon). The operation of the MOS-FET is such that by applying proper voltage at the Gate one can generate either a depletion region in the Silicon and then the transistor is closed, or an inversion region and then there is a conducting region from the Source to the Drain and electric current can go through.

FIGS. 6B and 6C show one example of a MOS-like transistor configuration 500 of the present invention. Device 500 includes a holey structure 510, e.g. a photonic crystal, in which two spaced-apart hollow regions are filled with respectively Metal and semiconductor (p-type Si) and constitute two spaced-apart electrically conductive cores $C_1$ and $C_2$ spaced by the electric insulator (oxide) of the fiber material. As shown in FIG. 6C, an electric current goes along the fiber through the Silicon; a dashed arrow shows the direction of the current.

FIG. 6D shows another example of a MOS-like transistor configuration 600 of the present invention. Device 600 includes a holey structure 610, e.g. a photonic crystal, in which two spaced-apart hollow regions are filled with respectively Metal and semiconductor (p-type Si) and constitute two spaced-apart electrically conductive cores $C_1$ and $C_2$ spaced by the electric insulator (oxide) of the fiber material. Metal core $C_1$ serves as a gate-on-insulator electrode of the transistor. Core $C_2$ is a p-type semiconductor which has two spaced-apart n-type doped regions, which serve as the source and drain of the transistor with the p-type channel between them. Here, electric current goes across the Silicon wire which includes the $n^+$ and the p-type regions. The Gate voltage connected to the Metal wire determines the state of the transistor. It should be noted that since the technique of the present invention (i.e. implementing transistor elements within the hollow regions of a holey fiber, e.g. photonic crystal) allows for nano-scale width (cross-sectional dimension) of the Silicon wire, the invention provides for obtaining a quantum transistor.

In the configuration of FIG. 6D, the connection of such an in-fiber transistor to an RF transmission line is done differently. For instance, the $n^+$ regions of the Silicon can be connected to two different metal wires in the next fiber, as shown in FIG. 6E, and those wires are shortened or not according to the electric command at the Gate.

Figure 7:
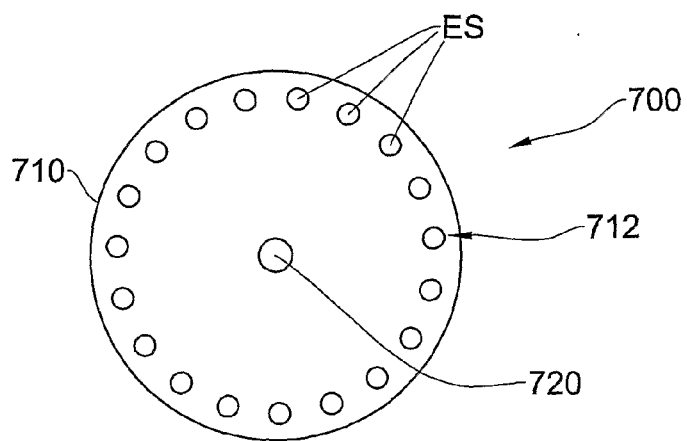
FIG. 7 exemplifies a cable unit configured according to the invention and suitable to be used in data communication systems.

Reference is made to FIG. 7, showing yet another example of the invention. In this example, the invention provides a cable structure 700 for use in data communication. Cable structure 700 includes an electrically non-conductive holey structure 710, carrying at least one cable unlit, single such unit 712 in the present example, being formed by an electrically conductive core 720 and an array of electrically conductive cores ES arranged to surround core 720 (e.g. arranged in a circular array around the core 720. Core 720 passes therethrough a data-carrying electric signal; an array of electrically conductive cores ES is arranged so as to surround the cable unit. Thus, an array of electrically conductive cores ES presents the electromagnetic shield to the data-carrying core. The electromagnetic shield screens core 720 from the outside electromagnetic fields, as well as screens the outside from the fields induced by the current flow through the core. Thus, the electromagnetic shield of the invention reduces power losses (even in the case where only one device is present in the fiber) as well as cross-talk between multiple devices (in the case where several devices are present in the same fiber). This electromagnetic shield can be considered as special type of the Faraday cage, i.e. Faraday cage adapted for holey fiber structures.

It should be understood that although the above screening arrangement is exemplified herein in connection with a communication cable, the same concept may be used in another example of the invention.

The device of the present invention can be fabricated using various techniques. Conventional holey fibers can be fabricated by pulling from a so-called preform, which is a glass rod with a few centimeters diameter and roughly a meter in length. Along its axis, the preform contains region(s), which will define the core(s) cavity. Preforms can be fabricated e.g. by chemical vapor deposition (CVD) in a silica tube or with the rod-in-tube technique, where a doped rod of glass with higher refractive index is inserted into another glass tube. When heated close to the melting point, the preform allows pulling a thin fiber out of it, the fiber length can be very long (many kilometers). During the pulling process, the fiber diameter is held constant by automatically adjusting the pulling speed with a feedback system.

The method for fabricating devices of the present invention can be based on this conventional technology, appropriately modified to enable filling some of holey fibers capillaries with semiconductors and/or metal material to form said electrically conducting cores. The difficulty is associated with the fact that the capillaries diameter is too small to push the wires through. The suggested solution is to insert wires into the pre-form prior to its drawing into a fiber (when the capillaries diameter is yet large enough for wires insertion).

The main problem exhibited by filling a pre-form with semiconductor materials (e.g. Si or GaAs) is that many of these materials expand on solidification from the molten state and may break the pre-form capillary. For example, if Si rod is inserted into a pre-form capillary and melted during the drawing or the tapering, the capillary may break during the cooling process. The technology developed by the inventor allows for filling capillaries with Si without breaking the structure's periodicity. This result has been obtained by providing additional cladding layers that surround the Si semiconductor core, the resulting structure being strong enough such that it was not damaged during the cooling off process.

Figure 8A:
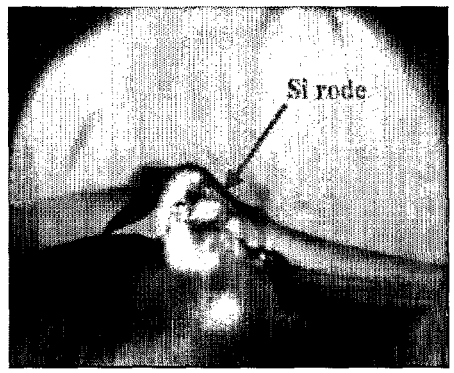
FIGS. 8A to 8I schematically illustrate an example of the method of fabricating a holey structure based electronic device of the present invention having a semiconductor core.
Figure 8B:
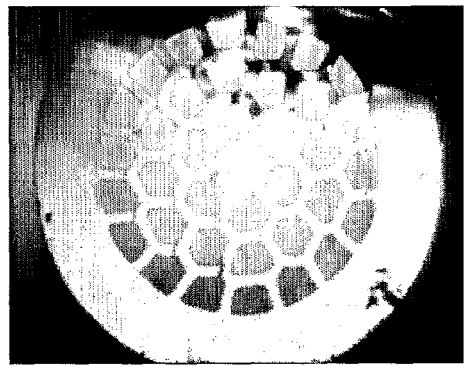
Figure 8C:
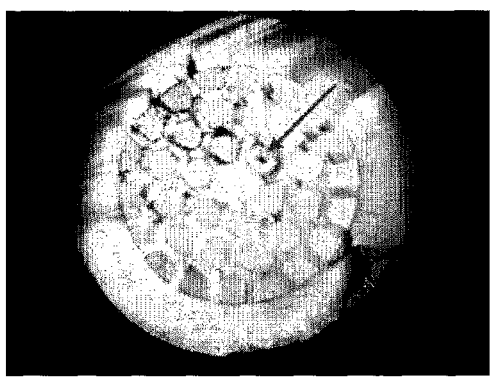
Figure 8D:
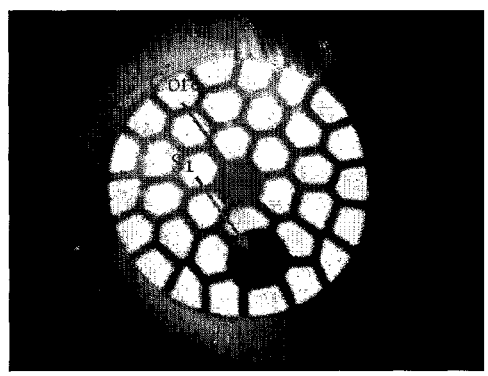
Figure 8E:
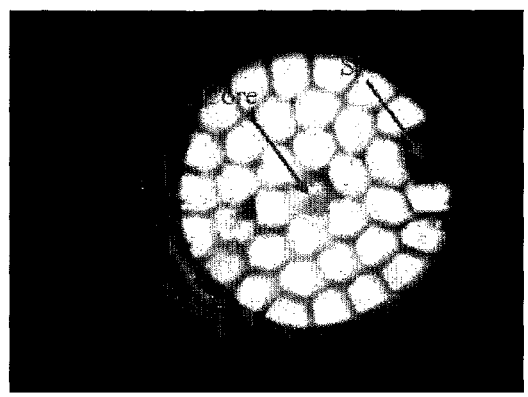
Figure 8F:
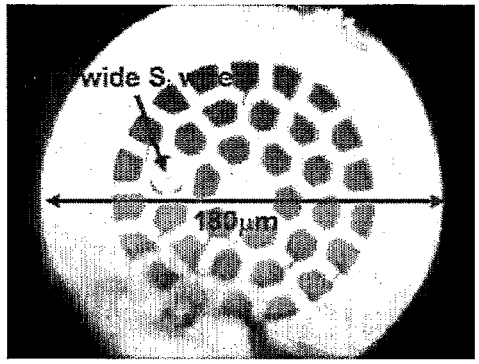
Figure 8G:
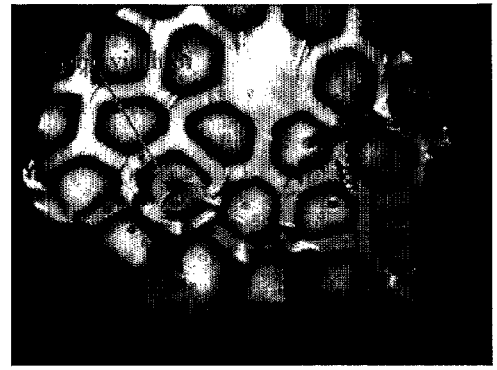

Using a capillary filled with silicon rod with not sufficiently large ratio between the outer diameter of the capillary and the diameter of the silicon rod may not suffice to prevent it from breaking during the cool off stage after drawing. In one example, in order to make the capillary stronger, the inventor used a rod which was composed of the inner Si core and outer silica coating (cladding). A ratio between the core and cladding cross-sectional dimensions (diameters), e.g. one to 20 in diameter, was sequentially significantly increased. Such rod is shown in FIG. 8A. For example, the inventor started with inserting a silicon core into a preform (tube), then drew it, and then placed it inside another preform (tube) and drew it again. After repeating this procedure three times, the perform tubes did not break any more during the drawing. FIG. 8A is the final result, showing a Si rod plunged into large amount of cladding glass which helped to prevent breakage. The Silica clad-Si rod then was inserted into the holey structure pre-form shown in FIG. 8D. The insertion was conducted three times for three different positions of the Silica clad-Si rod: in the example of FIG. 8C the rod was plunged into the hole adjacent to the optical (central) core, in FIG. 8D the rod was plunged into the hole being one hole spacing apart from the optical core, and in FIG. 8E the rod was plunged into the hole being two hole spacings apart from the optical core. The next stage consisted of drawing a fiber with a small width Si semiconductor core. FIGS. 8F and 8G show different pictures of the same fiber, where FIG. 8G shows the light coupling into the device. The resulting holey fiber seen in the figures has a Si core of a 2 μm width.

Figure 8H:
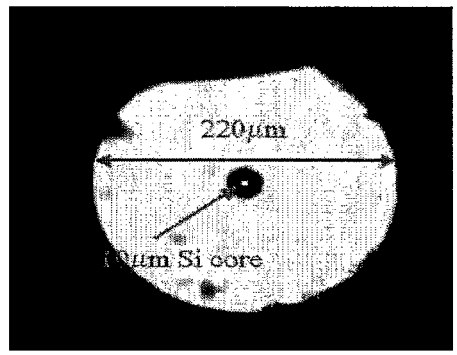
Figure 8I:
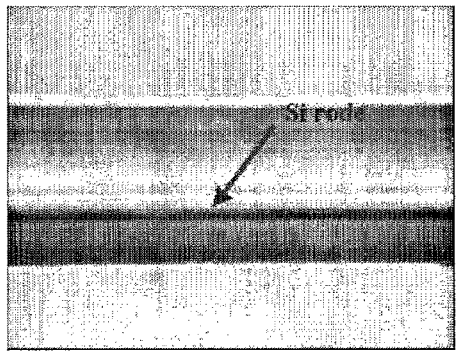

Another example of a Si-core fiber, fabricated with technique of the invention, is shown in FIG. 8H (top view) and 8I (side view). The diameter of this fibre is 220 μm and the diameter of its Si core is 10 μm.

The main problem with insertion of metallic wires into e.g. silica fiber is that the melting temperature of most metals is much lower than of silica (e.g. melting temperature of copper is about 600° C. and of gold is about 1060° C. while melting temperature of silica is about 1900° C.). This makes it difficult to obtain a continuous wire inside the device. This problem can be solved by usage of a metal with a relatively high melting temperature (e.g. gold), cladding with a relatively low meting temperature (e.g. vycor), and a drawing process preventing the metal from running out of the holey fiber.

In more detail, the inventor first inserted the conductive wire (pure gold, with melting point 1060° C.) into the vycor glass pre-form. At this stage holes of the capillaries are yet sufficiently large in diameter to push the wire through. Vycor glass includes 96% silica and 3% of $B_2O_3$, and the rest is $Na_2O$ and $R_2O_3 \pm RO_2$, where R is mostly $Al_2O_3$ and $ZrO_2$. Vycor glass melting temperature is of about 1600° C. Then, the pre-form was inserted into the furnace such that the pre-form's lower edge was below the furnace and the pre-form's upper edge was above the furnace (and the middle in the furnace). In that configuration, both edges of the vycor did not melt and were sufficiently cold to prevent the gold from melting away. Then, the drawing was performed. The result was a holey fiber with a continuous golden wire inside.

Figure 9A:
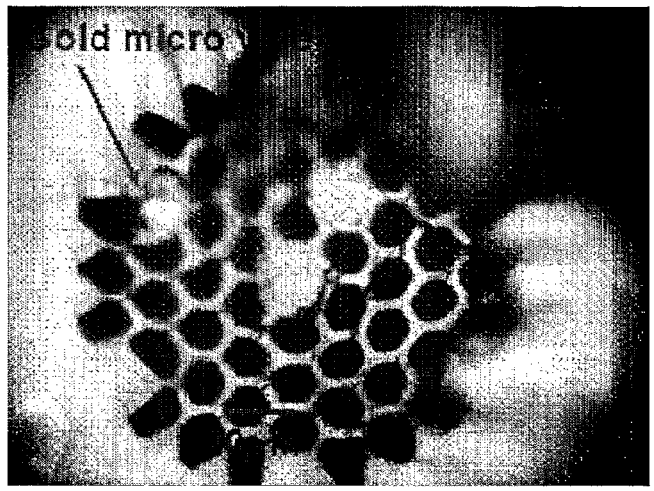
FIGS. 9A to 9C schematically illustrate another example of the method for fabricating a holey structure based electronic device of the present invention having a metal core.
Figure 9B:
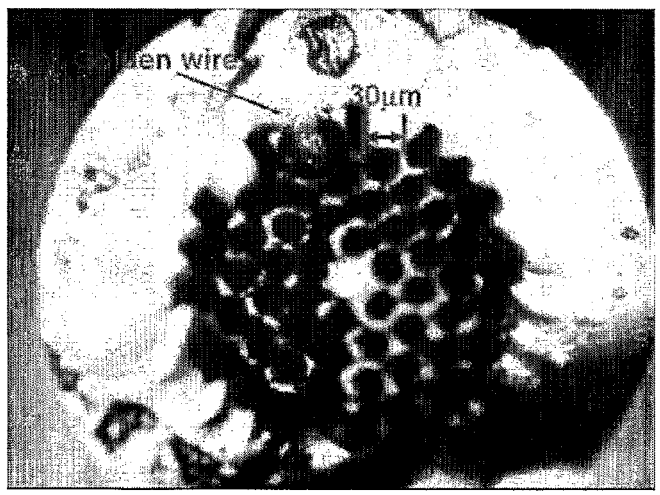
Figure 9C:
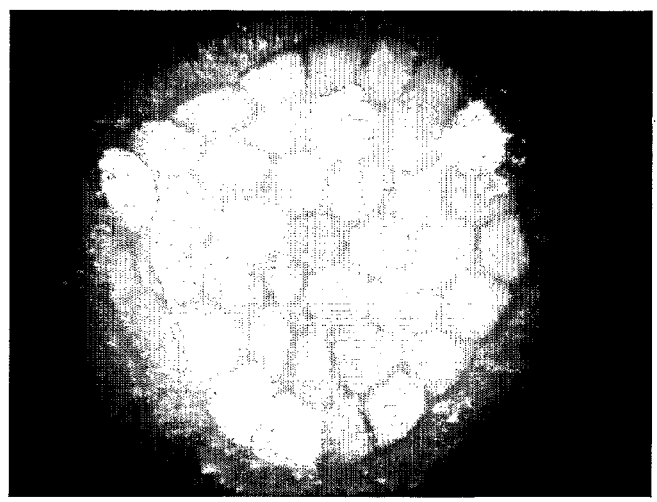

FIGS. 9A-9C show cross section views of realized configurations. FIG. 9C shows a holey fiber having seven (continuous) golden wires inside. Although with a lower yield, this technology also proved the possibility of fabrication of silica holey fibers with golden wires cores. The obtained golden wires demonstrated continuous conductance.

Figure 10A:
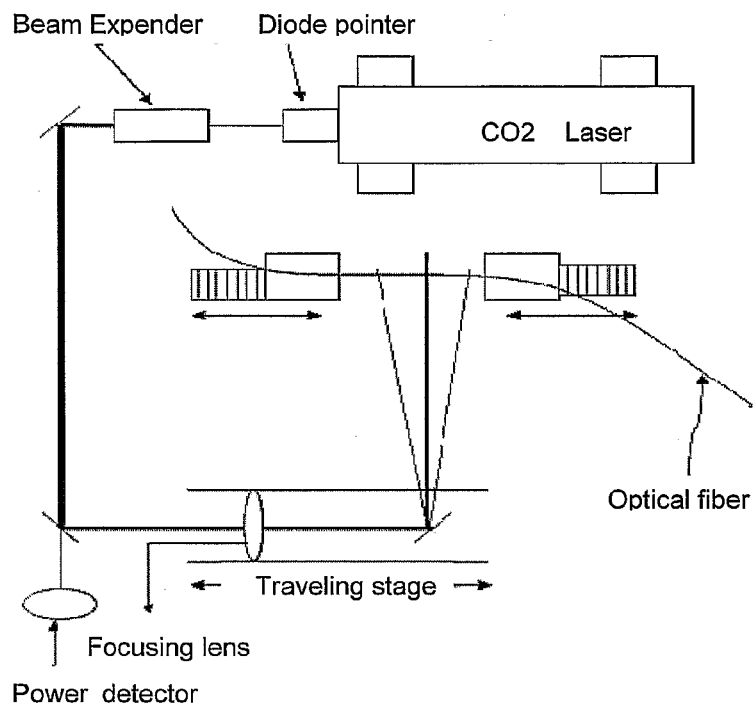
FIGS. 10A-10B exemplify a set up used in a method of the invention for fabricating a holey structure based electronic device having a number of semiconductor and/or metal cores.
Figure 10B:
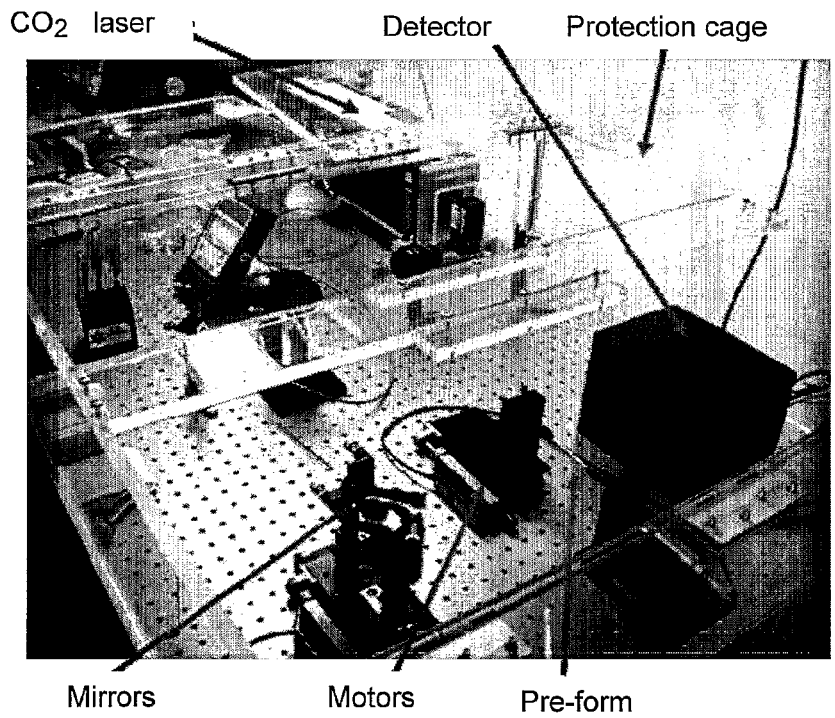

Referring to FIGS. 10A and 10B, there is shown an experimental setup used by the inventor for yet another technique of fabrication of holey fibers with some of the capillaries filled by metals/semiconductors or other conductive materials. According to this technique, pre-forms are tapered by using 40 W $CO_2$ laser and controlled stages/motors. More specifically, a structure, formed by a cladding perform with conductor(s)/semiconductor(s) inserted therein, is pulled while being locally heated (e.g. scanned by laser energy). This procedure is aimed at decreasing the cross-sectional dimension of such a structure. The tapering allows for achieving nanometric scale of the resulting fibers. The fiber can be reduced into a taper with a diameter of a few microns, and thus the metallic electrodes become very thin. The depicted tapering rig of FIGS. 10A and 10B facilitated the fabrication of the super resolving tapers suggested by the inventor, i.e. the tapers with nano-scaled internal conductors/semiconductors.

Figure 11A:
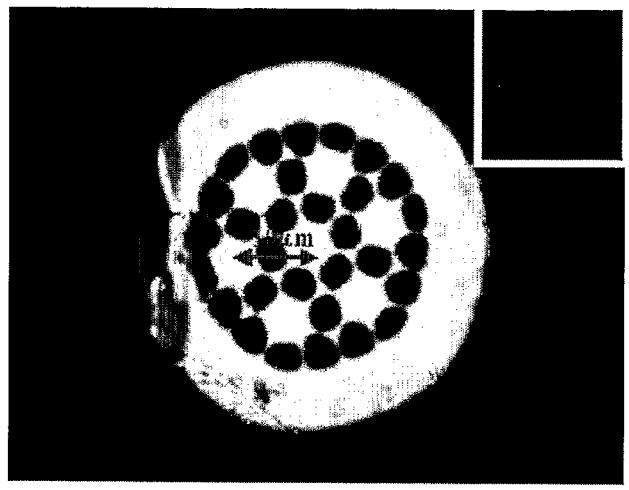
FIGS. 11A-11C show the experimental results obtained with the set up of FIGS. 10A-10B.
Figure 11B:
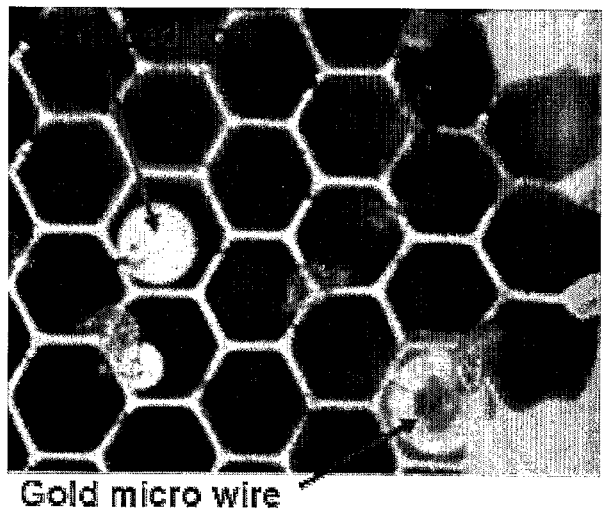
Figure 11C:
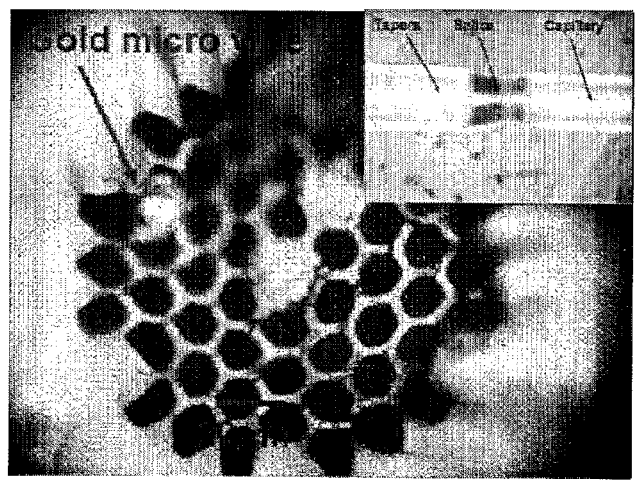

FIGS. 11A-11C show some fabrication examples in which single and several golden wires are inserted into the holey fiber silica substrate. FIG. 11A shows a multi-mode fiber, inset in the figure showing spots of light coupled therein. FIG. 11B exemplifies the Ge core and gold wire (being nanometric cores) inserted into a multi mode holey fiber. FIG. 11C presents a nanometric pre-form with internal golden wire tapered to another fiber. As the tapering technique of the present invention avoids the constant tension present in the drawings furnace as well as utilizes highly localized heating, the tapering technique allows for reducing the cross-sectional dimensions (e.g. diameter) of the fiber and cores carried therein. Moreover, the tapering technique allows for appropriate fast is change of the fiber diameter and keeping the preform at the fiber ends, thus allowing for avoiding the etching procedure to open electrodes, and facilitating the device input and output.

Thus, the present invention provides various configurations of electronic devices utilizing a holey structure where at least two hollow regions are configured as electrically conductive electrically insulated from each other cores. The invention provides for manufacturing light modulators, temperature sources/sensors, as well as MOS-like transistors and improved communication cables.

Those skilled in the art will readily appreciate that various modifications and changes can be applied to the embodiments of the invention as hereinbefore exemplified without departing from the scope as defined in and by the appended claims.

The invention claimed is:

1. An electronic device for creating at least one predetermined stimulus at the device output, the device comprising: an electrically non-conductive holey structure carrying at least two active electrically conductive cores electrically insulated from one another along their lengths, for supplying a potential difference between them, and at least one stimulus creator configured to be affected by said potential difference to provide a predetermined output of the device, said at least two active electrically conductive cores comprising at least one of the following combinations: two metal cores, two semiconductor cores, and one metal and one semiconductor core, said at least two active electrically conductive cores being made of different electrically conductive materials and being connected in series by an electrical connector connecting distal ends of the cores, the device being configured and operable as a temperature source creating a temperature change at the distal end of the device in response to the potential difference applied between proximal ends of said cores.

2. The device of claim 1, wherein said output includes at least one of the following: electrical signal, light signal, and temperature field.

3. The device of claim 1, wherein said at least one stimulus creator comprises at least one semiconductor core extending between and substantially parallel to said two electrically conductive cores, the device being thereby configured and operable as a light modulator.

4. The device of claim 3, wherein said at least one semiconductor core is made of an electro absorbing material, the light modulator being operable to attenuate light.

5. The device of claim 3, wherein said at least one semiconductor core material is selected to enable an electro-optical effect, the light modulator being adapted for amplitude and/or phase modulation of light.

6. The device of claim 5, wherein said at least one semiconductor core material is selected to affect polarization of light passing therethrough in response to an electric field applied thereto, the device being configured and operable as the phase modulator.

7. The device of claim 6, wherein said at least one semiconductor core material includes LiNbO3 or GaAs.

8. The device of claim 3, wherein said semiconductor material includes one of the following: GaAs-based material, InP-based material, and a combination of such materials.

9. The device of claim 3, wherein the light modulator comprises a tunable frequency filter unit, a beam splitter unit accommodated at the output of said filter unit for separating a portion of light output of the filter unit towards a control unit and allowing passage of remaining light to an input of said holey structure, the device thereby providing for controllably operating the holey structure to adjust the intensity of light output from said holey structure.

10. The device of claim 9, wherein said control unit is configured and operable to enable analyzing of the light intensities of different frequencies incident on the tunable filter, and operate the holey structure to prevent the light intensities higher than a certain threshold to be in the output of said holey structure.

11. The device of claim 10, wherein the control unit is configured and operable to operate the tunable filter to scan the frequency range of light that can propagate through said holey structure from the environment.

12. The device of claim 9, configured and operable as a goggle, each goggle lens carrying said light modulator, thereby enabling to adjust the intensity of light passing towards user's eyes.

13. The device of claim 1, wherein said at least one stimulus creator is a channel for passing one or more substances therethrough, the device being therefore configured and operable as a microprobe enabling to controllably affect a region of interest by material deliver thereto or removal therefrom in response to the potential difference between said two cores.

14. The device of claim 13, wherein said at least two active electrically conductive cores comprise at least one of the following combinations: two metal cores, two semiconductor cores, and one metal and one semiconductor core.

15. The device of claim 1, configured and operable as a sensor for sensing a temperature change in the vicinity of the distal end of the device detectable as a change in the potential difference between proximal ends of said cores.

16. The device of claim 15, wherein said holey structure is configured to define first and second light channels, the first light channel being configured as a single-mode illumination channel and the second light channel being configured as a multi-mode collection channel, the device therefore enabling imaging of a region of interest in the vicinity of the distal end of the device.

17. The device of claim 15, wherein said holey structure is configured to define at least one channel for passing one or more substances therethrough towards a region of interest in the vicinity of the distal end of the device, the device being therefore configured and operable as a microprobe enabling to controllably affect said region by material deliver thereto or removal therefrom.

18. The device of claim 1, wherein said holey structure is configured to define first and second light channels, the first light channel being configured as a single-mode illumination channel and the second light channel being configured as a multi-mode collection channel, the device therefore enabling imaging of a region of interest in the vicinity of the distal end of the device.

19. The device of claim 1, wherein said holey structure is configured to define at least one channel for passing one or more substances therethrough towards a region of the temperature change, the device being therefore configured and operable as a microprobe enabling to controllably affect said region by material deliver thereto or removal therefrom.

20. The device of claim 1, comprising an array of electrically conductive cores arranged so as to surround said at least two cores, thereby forming an electro-magnetic shield for said two cores.

21. A method for manufacturing an electronic device of claim 1, the method comprising: providing a structure formed by a perform of a cladding material with one or more rods of electrically conductive material inserted therein;
applying local heating to said structure with concurrent pulling of the structure, thereby decreasing cross-sectional dimensions of said structure.

22. The method of claim 21, comprising applying a laser beam to carry out said local heating.

23. The method of claim 21, wherein said at least one rod is prepared as follows: providing a first preform from a cladding material, inserting a first semiconductor rod into said first perform, drawing the first perform with said rod to obtain a second rod structure formed by the semiconductor core coated by the cladding, inserting the second rod structure into a second perform of a cladding material, and drawing said second preform with the second rod structure therein, thereby obtaining said at least one rod formed by a semiconductor core of a smaller diameter coated with the cladding material.

24. An electronic device for creating at least one predetermined stimulus at the device output, the device comprising: an electrically non-conductive holey structure carrying at least two active electrically conductive cores electrically insulated from one another along their lengths, for supplying a potential difference between them, and at least one stimulus creator configured to be affected by said potential difference to provide a predetermined output of the device, wherein said at least one stimulus creator is a channel for passing one or more substances therethrough, the device comprising additional first and second active electrically conductive cores which are made of different electrically conductive materials and are connected in series by an electrical connector connecting distal ends of the cores, the device being configured as a multi-functional microprobe enabling to controllably affect a region of interest by material deliver thereto or removal therefrom in response to the potential difference between said two cores and enabling creation of a temperature change at the distal end of the device in response to the potential difference applied between proximal ends of said additional first and second cores.

25. An electronic device for creating at least one predetermined stimulus at the device output, the device comprising: an electrically non-conductive holey structure carrying at least two active electrically conductive cores electrically insulated from one another along their lengths, for supplying a potential difference between them, and at least one stimulus creator configured to be affected by said potential difference to provide a predetermined output of the device, wherein said at least one stimulus creator is a channel for passing one or more substances therethrough, the device comprising additional first and second active electrically conductive cores which are made of different electrically conductive materials and are connected in series by an electrical connector connecting distal ends of the cores, the device being configured as a multi-functional microprobe enabling to controllably affect a region of interest by material deliver thereto or removal therefrom in response to the potential difference between said two cores and enabling sensing a temperature change in the vicinity of the distal end of the device detectable as a change in the potential difference between proximal ends of said additional first and second cores.

26. An electronic device for creating at least one predetermined stimulus at the device output, the device comprising: an electrically non-conductive holey structure carrying at least two active electrically conductive cores electrically insulated from one another along their lengths, for supplying a potential difference between them, and at least one stimulus creator configured to be affected by said potential difference to provide a predetermined output of the device, said at least two active electrically conductive cores comprising at least one of the following combinations: two metal cores, two semiconductor cores, and one metal and one semiconductor core, said at least two active electrically conductive cores being made of different electrically conductive materials and being connected in series by an electrical connector connecting distal ends of the cores, the device being configured and operable as a sensor for sensing a temperature change in the vicinity of the distal end of the device detectable as a change in the potential difference between proximal ends of said cores.

* * * * *

UNITED STATES PATENT AND TRADEMARK OFFICE
CERTIFICATE OF CORRECTION

| | |
|---|---|
| PATENT NO. | : 7,777,929 B2 |
| APPLICATION NO. | : 11/814717 |
| DATED | : August 17, 2010 |
| INVENTOR(S) | : Zeev Zalevsky |

It is certified that error appears in the above-identified patent and that said Letters Patent is hereby corrected as shown below:

On the Title Page, Item (75) Inventor, correct the incorrectly spelled inventor name by deleting "Zeez Zalevsky" and insert --Zeev Zalevsky--.

On the Title Page, Item (73) Assignee, correct the incorrectly spelled assignee name by deleting "Bar lian University" and insert --Bar Ilan University--.

Signed and Sealed this
Fifth Day of July, 2011

David J. Kappos
*Director of the United States Patent and Trademark Office*